United States Patent [19]

Uchinami

[11] Patent Number: 5,053,968

[45] Date of Patent: Oct. 1, 1991

[54] AIR-FUEL RATIO CONTROL APPARATUS

[75] Inventor: Masanobu Uchinami, Himeji, Japan

[73] Assignee: Mitsubishi Denki K.K., Tokyo, Japan

[21] Appl. No.: 366,794

[22] Filed: Jun. 15, 1989

[30] Foreign Application Priority Data

Jul. 27, 1988 [JP] Japan ................................ 63-188805

[51] Int. Cl.[5] ....................... G06F 15/48; G06F 15/50; G06G 7/70; F02M 51/00

[52] U.S. Cl. .......................... 364/431.05; 364/431.01; 123/489

[58] Field of Search ....................... 364/431.05, 431.06, 364/431.01, 431.03; 123/440, 480, 489

[56] References Cited

U.S. PATENT DOCUMENTS 4,467,770 8/1984 Arimura et al. .................... 123/489
4,788,958 12/1988 Nakajima et al. .................. 123/489

FOREIGN PATENT DOCUMENTS 3229763 2/1983 Fed. Rep. of Germany .
3500608 7/1986 Fed. Rep. of Germany .
63-94049 4/1988 Japan .

*Primary Examiner*—Parshotam S. Lall
*Assistant Examiner*—E. J. Pipala
*Attorney, Agent, or Firm*—Sughrue, Mion, Zinn, Macpeak & Seas

[57] ABSTRACT

An air-fuel ratio control apparatus comprises a broad range air-fuel ratio sensor to detect continuously an air-fuel ratio on the basis of components of exhaust gas from an engine, a determining means to determine a correction coefficient by obtaining an error between the target air-fuel ratio and an actual air-fuel ratio, an integrating means to integrate the correction coefficient, a non-volatile memory to store the integrated value as information of correction in relation to operational conditions of the engine, a processing means to calculate a basic fuel injection quantity on the basis of the operational conditions of the engine, and a correction means to correct the basic fuel injection quantity depending on the information of correction.

5 Claims, 7 Drawing Sheets

AIR-FUEL RATIO CONTROL APPARATUS

BACKGROUND OF THE INVENTION

1. Field of the Invention

The present invention relates to an air-fuel ratio control apparatus for an engine.

2. Discussion of Background

In a conventional air-fuel ratio control apparatus disclosed in, for instance, Japanese Unexamined Patent Publication No. 204942/1983, an air-fuel ratio is detected by an air-fuel ratio sensor on the basis of the components of exhaust gas, and the air-fuel ratio is corrected according to an integrated value obtained by integrating the output of the air-fuel ratio sensor.

In the conventional air-fuel ratio control apparatus, however, the air-fuel ratio sensor could only determine two kinds of values: a rich side and a lean side. Accordingly, the method of controlling the air-fuel ratio by integrating the output of the air-fuel ratio sensor was permitted only to increase or decrease a fixed value per unit of time, and it was difficult to obtain sufficient control of an air-fuel ratio since a sufficiently converged value could not be obtained unless an output to be detected is present in an operational zone for a relatively long time when the correction coefficient is large, whereby it was difficult to obtain purifying operations for the exhaust gas. Further, it was necessary to provide a thick air-fuel ratio to increase the output of the engine when the engine is operated at a high revolution speed and a high load. Accordingly, information of correction on the air-fuel ratio could not be obtained in this operational region.

SUMMARY OF THE INVENTION

It is an object of the present invention to provide an air-fuel ratio control apparatus capable of performing excellent, correct air-fuel ratio control by increasing the conversion of the control and by obtaining information of correction on the air-fuel ratio over the entire region.

The foregoing and other objects of the present invention have been attained by providing an air-fuel ratio control apparatus which comprises a broad range air-fuel ratio sensor to detect continuously an air-fuel ratio on the basis of components of exhaust gas from an engine, a setting means to set a target air-fuel ratio on the basis of operational conditions of the engine, A determining means to determine a correction coefficient by obtaining an error between the target air-fuel ratio and an actual air-fuel ratio, an integrating means to integrate the correction coefficient, a non-volatile memory to store the integrated value as information of correction in relation to the operational conditions of the engine, a processing means to calculate a basic fuel injection quantity on the basis of the operational conditions of the engine, and a correction means to correct the basic fuel injection quantity depending on the information of correction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
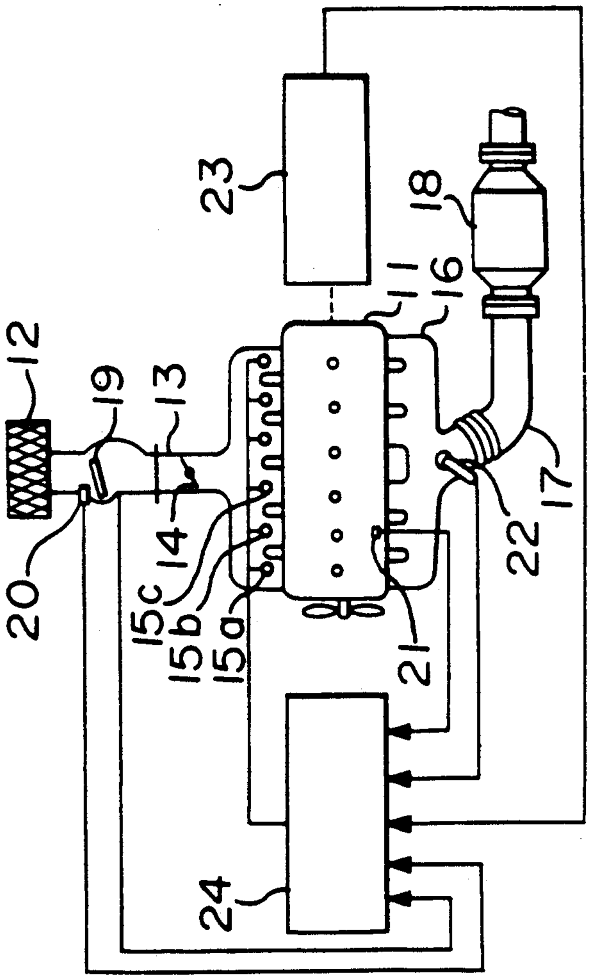
FIG. 1 is a diagram showing an embodiment of the air-fuel ratio control apparatus of the present invention.
Figure 9:
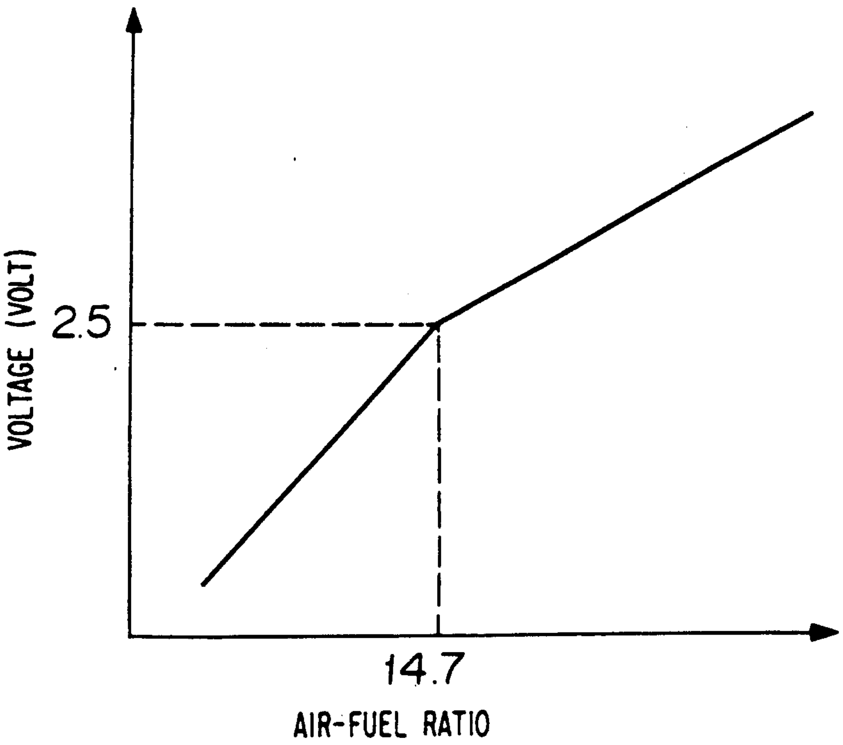
FIG. 9 shows the output voltage of the broad range oxygen sensor with respect to the detected air-fuel ratio.

Referring to the drawings, the same reference numerals designate the same or corresponding parts throughout the several views, and more particularly to FIG. 1 thereof, there is shown a diagram of the air-fuel ratio control apparatus of the present invention. In FIG. 1, a numeral 11 designates a well-known four-cycle spark ignition type engine mounted on an automobile. Air for combustion is sucked to the engine 11 through an air cleaner 12, an air intake pipe 13 and a throttle valve 14 in this order. Fuel is fed to the engine 11 through fuel injection valves 15*a*, 15*b* . . . provided in correspondence to each cylinder of the engine 11. After combustion of a gas mixture, exhaust gas is discharged to the atmosphere through an exhaust manifold 16, an air discharge pipe 17, three-way catalyst converter 18 and so on. On the air intake pipe 13, there is provided a potentiometer type sensor 19 to measure intake air supplied to the engine 11 to thereby output an analogue voltage in response to the intake air quantity and a thermister type intake air temperature sensor 20 which detects a temperature of air supplied to the engine to thereby output an analogue voltage (analogue detection signal) in response to the temperature of the sucked air. The engine 11 is provided with a thermister type cooling water temperature sensor 21 which detects a temperature of cooling water to thereby output an analogue voltage in response to the temperature of cooling water. The exhaust manifold 16 is provided with a broad range air-fuel ratio sensor 22 which is capable of detecting continuously an air-fuel ratio in a broad range from a rich side to a lean side on the basis of an oxygen concentration in the exhaust gas. The broad range air-fuel ratio sensor 22 is of such a type as disclosed in, for instance, Japanese Examined Patent Publication No. 18659/1987 that an air-fuel ratio is detected from an oxygen concentration in discharged air as a parameter, and a voltage value corresponding to the detected air-fuel ratio is obtainable from a diagram as shown in FIG. 9. The revolution speed of the crank shaft of the engine 11 is detected by a revolution speed sensor 23 so that it generates a pulse signal having a frequency in response to a revolution speed. For the revolution speed sensor 23, for instance, an ignition coil for an ignition device may be used. In this case, an ignition coil signal obtainable at the primary side terminal of the ignition coil can be used as a revolution speed signal. The detection signal of each of the sensors 19 to 23 is supplied to a control circuit 24 which processes a fuel injection quantity on the basis of the detection signals, and controls a time of opening electromagnetic type fuel injection valves 15*a*, 15*b* . . . ; thus the fuel injection quantity is controlled.

Figure 2:
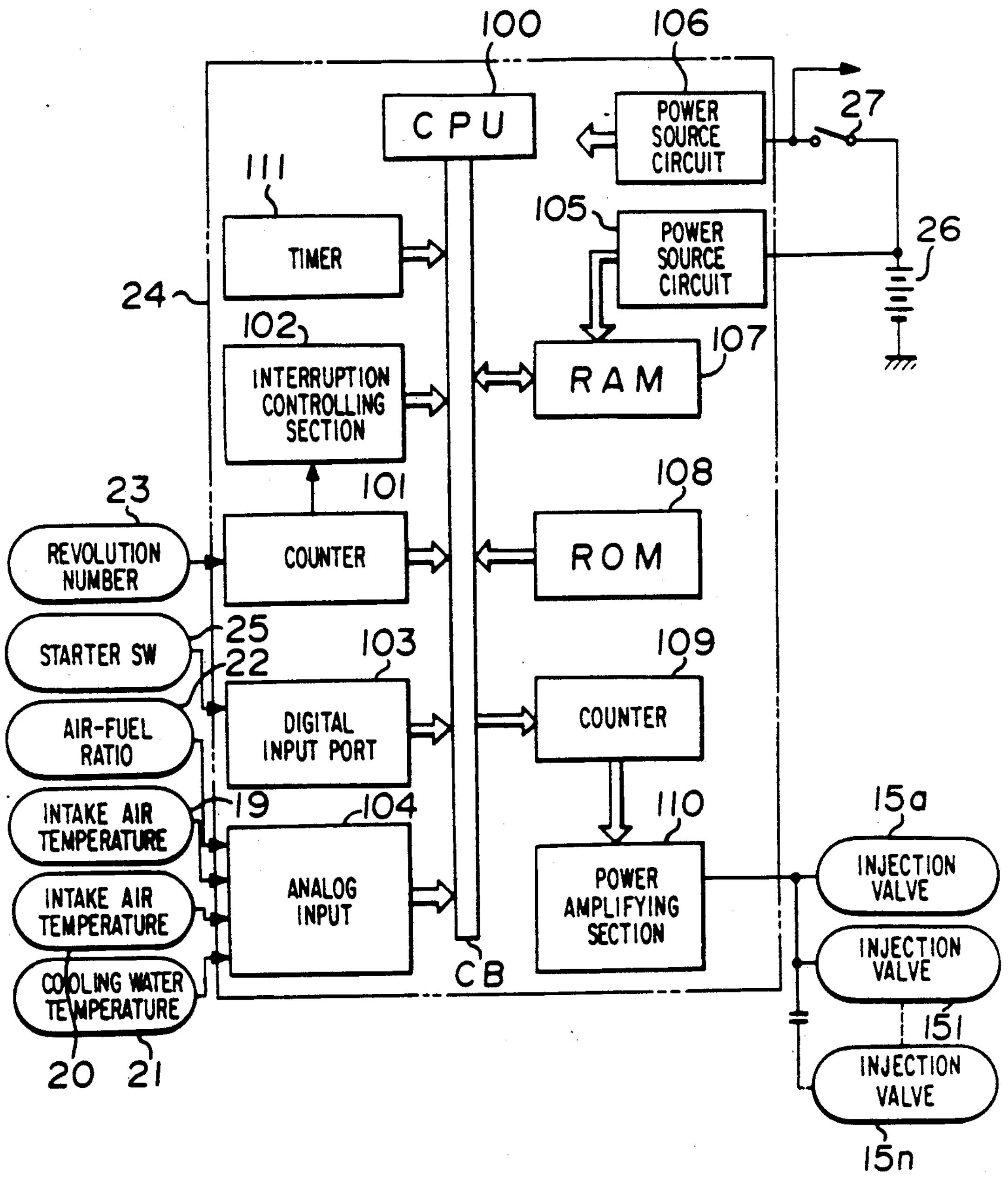
FIG. 2 is a block diagram showing an embodiment of the control circuit used for the control apparatus of the present invention.

FIG. 2 shows the detail of the construction of the control circuit 24. In FIG. 2, a numeral 100 designates a microprocessor (CPU) to operate the fuel injection quantity. A revolution number counter 101 counts the number of engine revolution on the basis of the signal from the revolution speed sensor 23. The revolution number counter 101 supplies an instruction of interruption to an interruption controlling section 102 in synchronism with the revolution of the engine. When the interruption controlling section 102 receives the signal, it outputs an interruption signal to the CPU 100 through a common bus CB.

A numeral 103 designates a digital input port which receives a signal in a digital form from a starter switch 25 for turning-on or off the operations of a starter (not shown) and transmits the starting signal to the CPU 100. A numeral 104 designates an analog input port composed of an analog multiplexer and an A/D transducer, which performs A/D conversion of each signal from the intake air quantity sensor 19, the intake air temperature sensor 20, the cooling water temperature sensor 21 and the air-fuel ratio sensor 22, these signals being sequentially read by the CPU 100. A numeral 105 designates a power source circuit to directly supply power from a battery 27 to an RAM 107. A key switch 27 is provided in the circuit including the battery 26. A power source circuit 105 is connected directly to the battery 26 without interposing the key switch 27 so that power is always applied to the RAM 107 regardless of operations of the key switch 27. The battery 26 is connected to the other power source circuit 106 through the key switch 27, and the power source circuit 106 supplies power to the elements other than RAM 107. The RAM 107 functions as a temporary memorizing unit which is temporarily used during the operations of a program and is constituted by a non-volatile memory wherein memorized data are not erased even by turning off the key switch 27 to thereby stop the operations of the engine. A numeral 108 designates a read only memory (ROM) in which programs and various constants are stored. A numeral 109 designates a fuel injection time controlling counter including resistors, which is constituted by a down-counter and is adapted to convert a digital signal representing an opening time of the electromagnetic type fuel injection valves 15*a*, 15*b*, i.e. a fuel injection quantity being calculated by the CPU 100, into a pulse signal representing a time width of pulse which determines an actual time of opening of the fuel injection valves 15*a*, 15*b*. A numeral 110 designates a power amplifying section to drive the fuel injection valves 15*a*, 15*b* . . . , and a numeral 111 designates a timer to measure the lapse of time and to transmit the measured time to the CPU 100. The revolution number counter 101 measures the number of revolutions of the engine on the basis of the output of the revolution speed sensor 23, for instance, for every one revolution of the engine and supplies an interruption instruction signal to the interruption controlling section 102 every time when the measurements are finished. The interruption controlling section 102 generates an interruption signal on the basis of the interruption instruction signal so that the CPU 100 executes a take-in processing routine for operating the fuel injection quantity.

Figure 3:
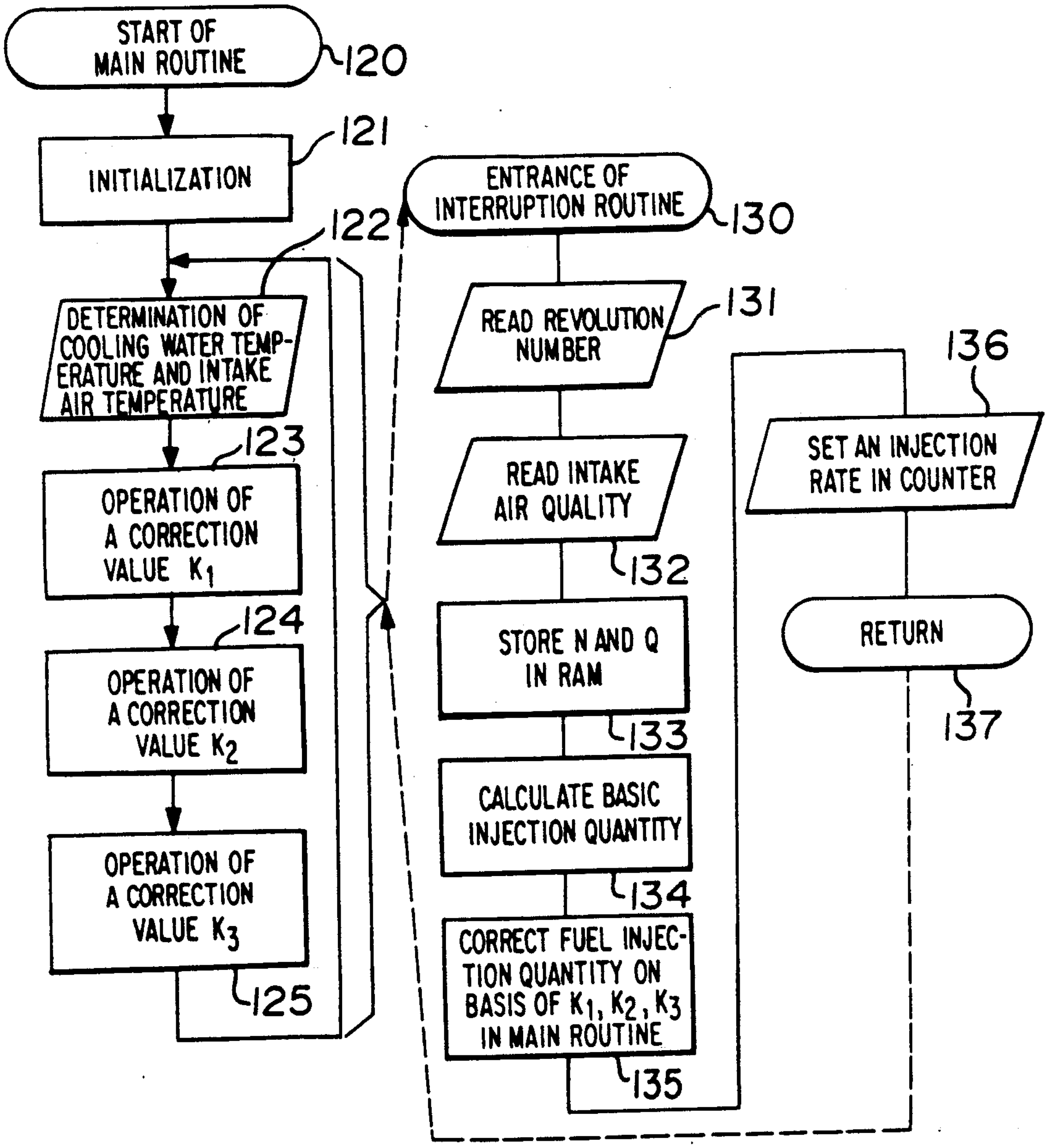
FIGS. 3 to 5 are respectively flow charts showing the operation of the control apparatus.

FIG. 3 shows a flow chart operated by the CPU 100. When the key switch 27 and the starter switch 25 are turned on to start the engine 11, a starting instruction is given at Step 120 to thereby initiate the processing of the main routine.

Initialization is executed at Step 121. Then, digital values corresponding to a cooling water temperature and an intake air temperature are read through the analog input port 104 at Step 122. A correction coefficient (correction quantity) $K_1$ is calculated on the basis of the read digital values at Step 123, and the calculated value is stored in the RAM 107. At Step 124, a digital value corresponding to the output of the air-fuel ratio sensor 22 is read through the analog input port 104, and an error between the read digital value and a target air-fuel ratio stored previously in the ROM 108 in correspondence to an operational region is obtained. The error is subjected to PID control to thereby obtain a correction coefficient (correction quantity) $K_2$. The correction coefficient $K_2$ is stored in the RAM 107.

Figure 4:
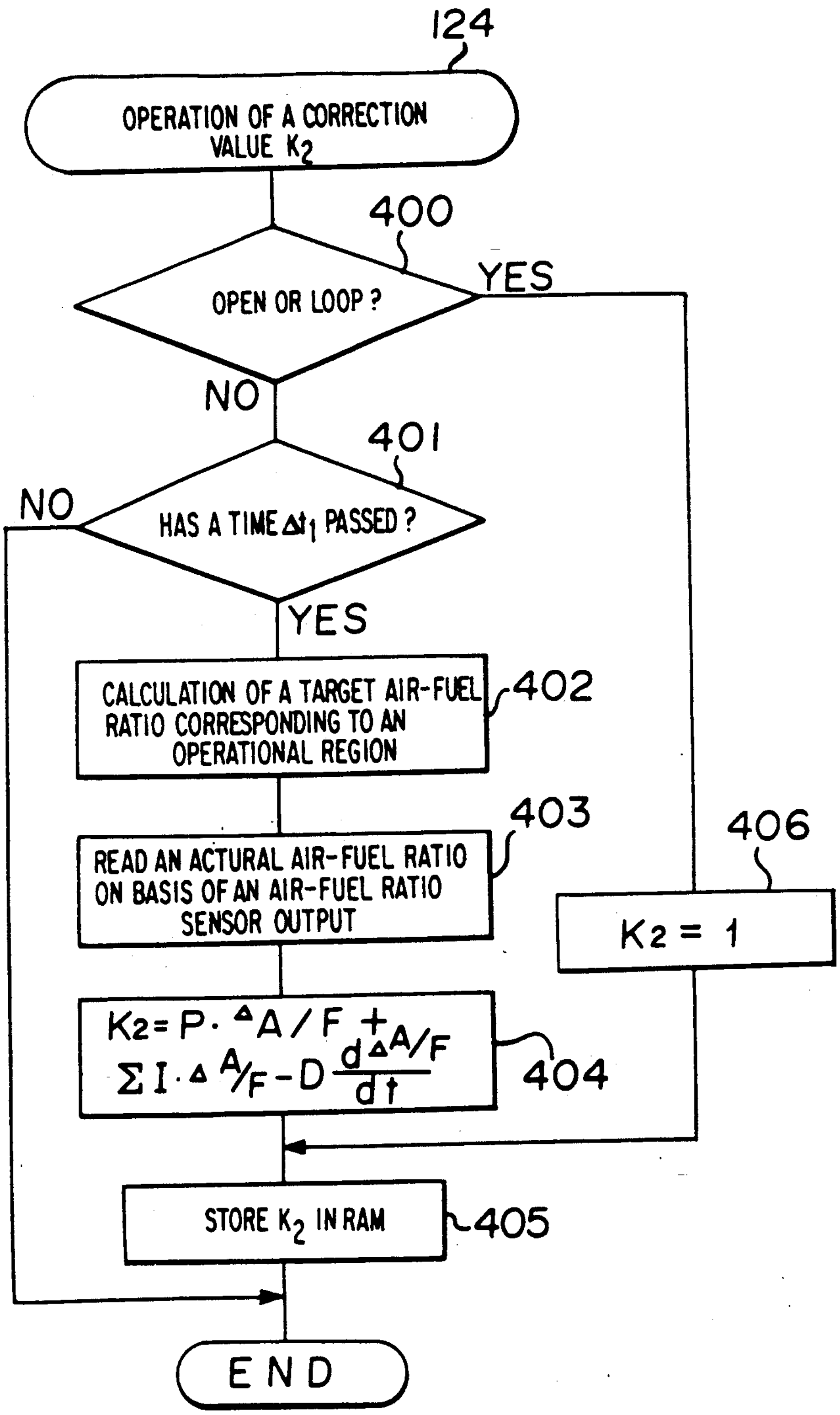

FIG. 4 shows a flow chart at Step 124 in detail. First, determination is made as to whether or not the air-fuel ratio sensor 22 is active at Step 400. When there is found an non active state of the sensor 22, i.e. a feed-back control can not be utilized, Step 406 is taken where the correction coefficient $K_2$ is rendered to be 1. Then, sequential Step goes to Step 405. On the other hand, when the feed-back control can be utilized, a time $\Delta t_1$ is measured at Step 401. When the time $\Delta t_1$ has passed, Step 402 is taken. At Step 402, a target air-fuel ratio which has been determined based on an engine revolution number N, an intake air quantity Q and a cooling water temperature and which is previously stored in the ROM is calculated taking account of the operational condition at the time. At Step 403, an actual air-fuel ratio corresponding to the output of the air-fuel ratio sensor 22 is read with a digital value. At Step 404, the correction coefficient $K_2$ is obtained as functions of a proportional term P, an integrating term I and a differentiating term D on the basis of an error $\Delta A/F$ between an actual air-fuel ratio and the target air-fuel ratio and a rate of change of air-fuel ratio $$\frac{d}{dt}(\Delta A/F).$$

At Step 405, the correction coefficient $K_2$ is stored in the RAM 107.

In FIG. 3, a correction coefficient (correction quantity) $K_3$ is obtained by summing or subtracting operations at Step 125, and a value obtained by the calculation is stored in the RAM 107. The purpose for processing the correction coefficient $K_3$ is to modify the basic fuel quantity with intervals of time so that the basic fuel quantity obtained by the basic opera ions is quantity required by the engine at present even when the feed back control of the air-fuel ratio is not carried out. Thus, by modifying the basic air-fuel ratio (the basic fuel quantity) it is possible that response of fuel supply at a transient time of the engine which prohibits a sufficient feed back of the air-fuel ratio is improved; change of structural element with the lapse of time and change in the performance are suitably compensated; change of the atmospheric pressure at a high land area is compensated without using an atmospheric pressure sensor; or the basic air-fuel ratio (the fuel quantity) is in agreement with a target air-fuel ratio (a requisite fuel quantity) even when the feed back control for the air-fuel ratio is stopped (in an open-looped control).

Figure 5:
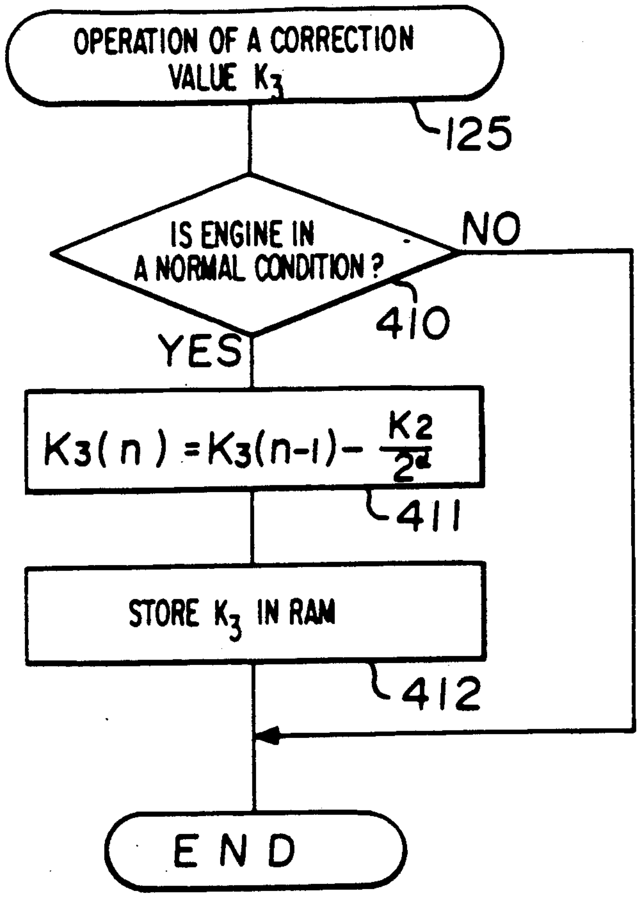
Figure 8:
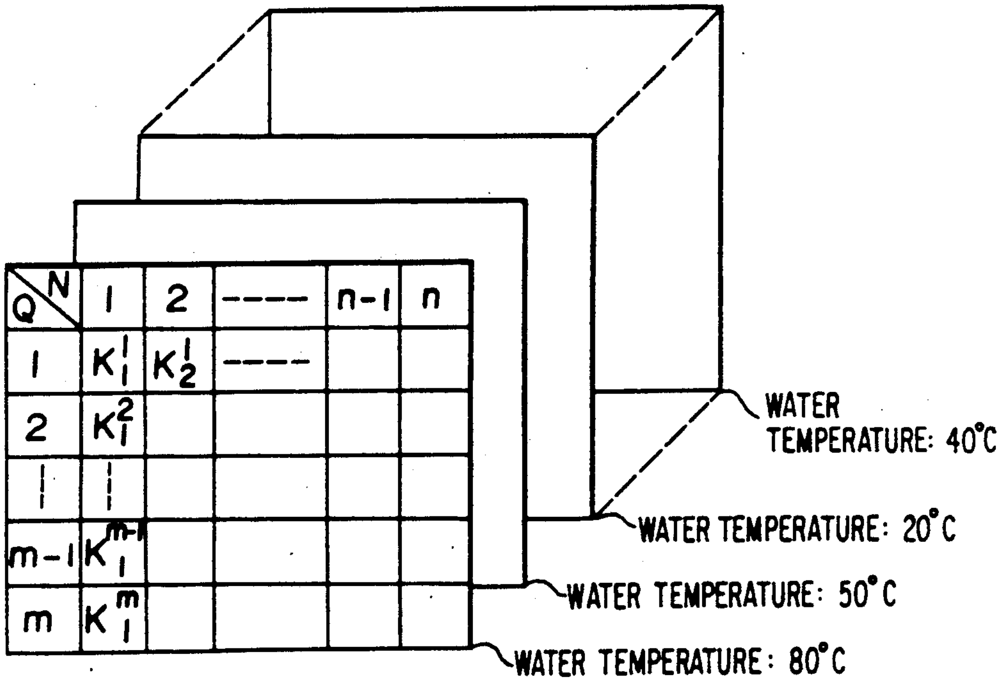
FIG. 8 is a diagram illustrating a map for memorizing correction coefficients.

FIG. 5 shows a flow chart at Step 125 in detail. First, determination is made as to whether or not the engine operates under normal condition at Step 410. This Step 410 is to remove an undesired condition that there is rapid change of the air-fuel ratio at a transient time of the engine, whereby a control of correction can not be sufficiently followed and converged. At Step 411, the correction coefficient $K_3$ is obtained by operations. The correction coefficient $K_3$ is determined by an intake air quantity Q, an engine revolution number N and a cooling water temperature, and is previously stored in the RAM 107 in a form of map as shown in FIG. 8. At Step 411, operations of $$K_3(n) = K_3(n-1) - \frac{K_2}{2^a}$$

is carried out where $K_3$ is mentioned above and $K_2$ is obtained at Step 404. This obtained value is stored in the corresponding address in FIG. 8 (Step 412) which is memorized in the RAM 107.

In this embodiment, $\alpha$ is set to be 8. Accordingly, when an error between the target air-fuel ratio and an actual air-fuel ratio is large and $K_2$ is large, $K_3$ is quickly converged in response to the error for $K^2$ having a large value.

Usually, the processing of the main routine from Step 122 to Step 125 are repeatedly executed in accordance with the control program. In FIG. 2, when the interruption signal for the operation of the fuel injection quantity is input from the interruption controlling section 102, the CPU 100 immediately stops the operations even when it executes the main routine and moves to the interruption processing routine (Step 130). At Step 131, a signal representing an engine revolution number N is read from the revolution number counter 101 at Step 131. Then, a signal representing an intake air quantity Q is read from the analog input port 104 at Step 132. At Step 133, the revolution number N and the intake air quantity Q are stored in the RAM 107 in order to use them as parameters for processing the correction coefficient $K_3$ in the operation of the main routine. At in agreement with a fuel Step 134, the basic fuel injection quantity (namely, the width of injection time for the fuel injection valves 15*a*, 15*b* . . . ) is calculated on the basis of the revolution number N and the intake air quantity by using an equation $$t = F \times \frac{Q}{N}$$

where F is a constant. At Step 135, the correction coefficients for fuel injection which are obtained in the main routine are read from the RAM 107 and calculation for correcting a fuel injection quantity (an injection time width) is carried out to determine an air-fuel ratio by using an equation to obtain the injection time width T: $T=t\times K_1\times K_2\times K_3$ at Step 136. Data on the fuel injection quantity are set in the counter 109. At Step 137 the interruption routine is returned to the main routine. Then, the steps interrupted by the interruption processing are taken again.

Figure 6:
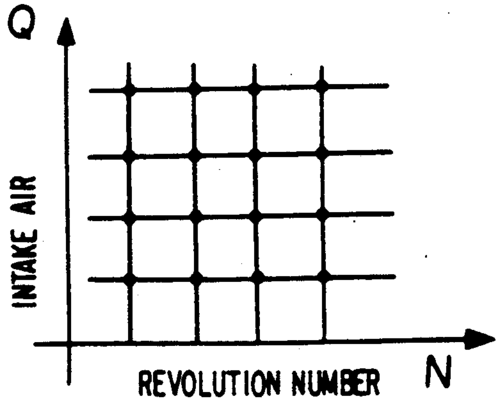
FIGS. 6 and 7 are respectively characteristic diagrams to calculate a target air-fuel ratio.
Figure 7:
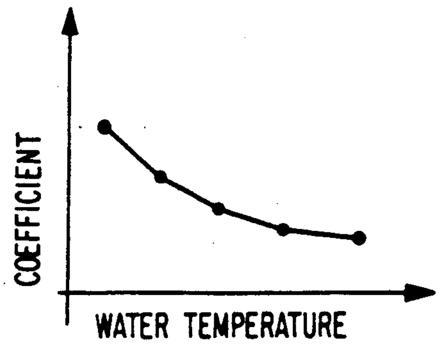

In the above-mentioned embodiment, the intake air quantity and the engine revolution number are used as parameters for determining the correction coefficient $K_3$ in the RAM in a form of map obtained by dividing at predetermined time intervals as shown in FIG. 6. However, it is possible to use only the intake air quantity as the parameter so that the correction coefficient $K_3$ can be indicated by $K^1$, $K^2$, $K^3$ . . . $K^m$; this reducing the number of $K_3$, i.e. the number of memories to thereby reduce the manufacturing cost and to eliminate a risk of occurrence of fault. Further, a degree of opening of a negative pressure type throttle valve may be used as a parameter instead of the intake air quantity Q.

In the above-mentioned embodiment, $K_3$ is operated and rewritten (stored) for each unit time at Step 125 where the correction coefficient K3 is operated and stored. However, $K_3$ may be operated and rewritten for each unit number of revolution $\Delta N$ of the engine.

Thus, in accordance with the present invention, the correction coefficient is determined depending on the error between the target air-fuel ratio and the actual air-fuel ratio. Accordingly, when the error is large, a value obtained by integration is also large, hence the correction coefficient is large, whereby the convergence of the air-fuel ratio control can be improved and excellent air-fuel ratio of a quick response can be obtained. The broad range air-fuel ratio sensor capable of detecting the air-fuel ratio so as to cover the entire area of the rich side to the lean side in a continuous manner is used. Accordingly, the air-fuel ratio can be controlled in the entire operational region including a transient time of the engine, in an inactive state of the air-fuel sensor, low cooling water temperature, a high load state of the engine, a high revolution speed of the engine and so on. Further, the air-fuel ratio control apparatus of the present invention can compensate a change with the lapse of time of the engine, the deterioration of the air-fuel ratio sensor and fluctuation in performance of the apparatus.

Obviously, numerous modifications and variations of the present invention are possible in light of the above teachings. It is therefore to be understood that within the scope of the appended claims, the invention may be practiced otherwise than as specifically described herein.

What is claimed is:

1. An air-fuel ratio control apparatus which comprises a broad range air-fuel ratio sensor to detect continuously an air-fuel ratio sensor to detect continuously an air-fuel ratio on the basis of components of exhaust gas from an engine, a setting means to set a target air-fuel ratio on the basis of operational conditions of said engine, a determining means to set a target air-fuel ratio on the basis of operational conditions of said engine, a determining means to determine a correction coefficient ($K_2$) by obtaining an error between said target air-fuel ratio and an actual air-fuel ratio, an integrating means to integrate said correction coefficient ($K_2$), producing an integrated value ($K_3$), according to the relation:

$$K_3(n)=K_3(n-1)-K_2/2^{\alpha},$$

a non-volatile memory to store said integrated value ($K_3$) as at least a part of information of correction in relation to the operational condition of the engine, a processing means to calculate a basic fuel injection quantity on the basis of the operational conditions of the engine, and a correction means to correct said basic fuel injection quantity depending on said information of correction.

2. The air-fuel ratio control apparatus according to claim 1, wherein said correction coefficient ($K_2$) is obtained by:

$$K_2 = P \cdot \Delta A/F + \Sigma I \cdot \Delta A/F - D\frac{d\Delta A/F}{dt}.$$

3. The air-fuel ratio control apparatus according to claim 1, wherein said target air-fuel ratio is determined by an engine revolution number, an intake air quantity and a cooling water temperature and is previously stored in an ROM.

4. The air-fuel ratio control apparatus according to claim 1, wherein said information of correction comprises coefficients $K_1 \times K_2 \times K_3$, where $K_1$ is a coefficient obtained by calculating a cooling water temperature and an intake air temperature, $K_2$ is a coefficient obtained based on an error between a target air-fuel ratio and an actual air-fuel ratio, and $K_3$ is a coefficient to correct a feeding rate of basic fuel quantity to the engine without a feed-back control of air-fuel ratio.

5. The air-fuel ratio control apparatus according to claim 1, wherein $\alpha = 8$.

* * * * *